United States Patent [19]

Kamath

[11] Patent Number: 5,016,867

[45] Date of Patent: May 21, 1991

[54] SHEET STACKING APPARATUS

[75] Inventor: Venkatesh H. Kamath, Fairport, N.Y.

[73] Assignee: Xerox Corporation, Stamford, Conn.

[21] Appl. No.: 445,224

[22] Filed: Dec. 4, 1989

[51] Int. Cl.[5] .............................................. B65G 31/00

[52] U.S. Cl. .................................... 271/209; 271/188; 271/200; 271/223

[58] Field of Search ................ 271/188, 209, 200, 223

[56] References Cited

U.S. PATENT DOCUMENTS

| | | | |
|---|---|---|---|
| 197,477 | 11/1877 | Kneeland | 271/188 |
| 3,160,413 | 12/1964 | Faeber | 271/188 |
| 3,749,398 | 7/1973 | Fujita et al. | 271/188 X |
| 3,934,872 | 1/1976 | Honkawa | 271/188 |
| 4,219,191 | 8/1980 | Rastorguyeff | 271/3.1 |
| 4,440,387 | 4/1984 | Ikoma et al. | 271/245 |
| 4,469,319 | 9/1984 | Robb et al. | 271/3.1 |
| 4,669,721 | 6/1987 | Westover | 271/272 |
| 4,732,375 | 3/1988 | Tetherton | 271/188 X |
| 4,744,555 | 5/1988 | Naramore et al. | 271/188 X |

FOREIGN PATENT DOCUMENTS

| | | | |
|---|---|---|---|
| 217461 | 9/1986 | Japan | 271/209 |
| 185768 | 8/1988 | Japan | 271/188 |

OTHER PUBLICATIONS

XDJ, vol. 11, No. 1, Jan./Feb. 1986, p. 27.
XDJ, vol. 6, No. 5, Sep./Oct., 1981, p. 237.
XDJ, vol. 7, No. 4, Jul./Aug. 1982, p. 277
XDJ, vol. 7, No. 2, Mar./Apr. 1982, p. 73.

*Primary Examiner*—Robert P. Olszewski
*Assistant Examiner*—Cheryl L. Gastineau
*Attorney, Agent, or Firm*—William A. Henry

[57] ABSTRACT

Sheet stacking apparatus for a buffer tray of a reprographic machine comprises a belt feeder including, at the input end of the feeder, a baffle which imparts a curved configuration to sheets in a direction transverse to the direction of travel. The output end of the feeder is defined by an output roll which cooperates with the belt of the feeder and is movable with the adjustable end guide of the buffer tray so that, as the length of the tray is increased, the length of the sheet path through the feeder is decreased and vice versa. The curved sheet configuration is maintained as sheets are conveyed through the feeder by the belt and is then further maintained by a second baffle as sheets are fed out, by the output roll, over the buffer tray.

5 Claims, 3 Drawing Sheets

SHEET STACKING APPARATUS

The present invention relates to an apparatus for stacking sheets in a location to which the sheets are fed individually in succession. The invention is especially, but not exclusively, applicable to sheet stacking apparatus for use in reprographic machines.

The stacking of sheets (both copy sheets and original documents) is an important operation in reprographic machines and in document-handling generally. In a reprographic machine, for example, original documents are re-stacked in the tray of a recirculating document handler after they have been copied, and completed copies are stacked in an output tray of the machine while, within the machine, duplex copies may be stacked in an intermediate storage (or duplex buffer) tray between the two printing operations that are required to place images on both sides of the copy sheets. In each case, the stack may be formed by feeding sheets in over the top of the tray and releasing the sheets so that they settle within the tray.

It is desirable that the trays in which documents are stacked should be adjustable to accommodate sheets of different sizes and that this adjustment should be accompanied by an appropriate adjustment in the length of the sheet feed path. Arrangements for achieving this are known.

For example, U.S. Pat. No. 4,219,191 describes a buffer tray to which documents are fed between cooperating upper and lower belts. The location of the downstream end of the lower belt and the location of an adjacent wall of the tray can be changed to enable the tray to receive documents of different lengths. The "Xerox Disclosure Journal" Volumes 11, No. 1, page 27 describes a recirculating document feeder for a copier, in which documents are guided to the feed roll nip of a restack tray between flexible baffles. The baffles unroll automatically, thereby extending their length, when the rear guide of the tray is moved forward to adjust the tray for a smaller documents (and vice versa for larger documents).

It is also desirable that the trajectory of a sheet as it enters a tray should be controlled, so that the sheet will consistently come to rest flat on top of the stack, in alignment with previously-stacked sheets and without disturbing any of the latter. Common problems associated with a lack of control over sheet trajectory are: (i) that an incoming sheet will push against, and disturb, a sheet which is already in the tray (known as "throating"); (ii) that a sheet will roll over as it enters the tray, and (iii) that the leading edge of an incoming sheet will fall and stub against the sheets that are already in the tray. Accurate stacking is of particular importance if the sheets are subsequently to be fed out from the tray for a further copying operation and various arrangements for controlling sheet trajectory with a view to achieving satisfactory stacking are known.

For example, U.S. Pat. No. 4,469,319 describes the use of an automatically varying corrugation apparatus to improve restack performance in a recirculating document handler of a copier. The corrugation apparatus is associated with the adjustable rear guide of the restack tray. The guide is moved when the tray is required to accommodate documents of a different size and the corrugation apparatus inparts an adjustable degree of corrugation to documents as they enter the tray.

Other arrangements for corrugating or imparting a degree of curvature to documents as they enter the restack tray of a recirculating document handler are described in the "Xerox Disclosure Journal" Volume 7, No. 4, page 277 and Volume 6, No. 5, page 237 while Volume 7, No. 2, pages 73 and 74 describes a pneumatic arrangement which is located directly above the restack tray.

The use of devices for corrugating or imparting curvature to documents is also known outside the field of sheet stacking. For example, the "Xerox Disclosure Journal" Volume 6, No. 4, page 175 describes a variable corrugation vacuum transport for a sheet feeder and U.S. Pat. No. 4,669,721 describes a bowed guide member which curves and feeds sheets into contact with a belt drive transport to improve sheet feeding.

The effect of static electricity on sheet stacking in the document handler of a copier is mentioned in U.S. Pat. No. 4,440,387 which proposes the provision of a metal brush to discharge documents as they enter the document handler.

Other arrangements relating to the stacking of sheets or flat articles are described in U.S. Pat. Nos. 3,988,019 and 4,676,495, U.S. Pat. No. 3,988,019 describes apparatus in which articles are transported by being held, at their margins, between double belt conveyors and is directed to the provision of arrangements for ejecting the articles from the conveyors at a desired location and at regular time intervals to form a stack or an overlapping stream of the articles. U.S. Pat. No. 4,676,495 describes a system for stacking security documents such as banknotes and provides an arrangement which ensures that the documents, including those that have already been stacked are held in security while stacking is in progress.

The present invention is concerned with the provision of stacking apparatus which can handle a variety of sheet sizes; which is of comparatively simple construction, and in which accurate stacking of sheets can be achieved.

The present invention provides sheet stacking apparatus including means for feeding sheets to form a stack at a stacking location, said means comprising a device arranged to impart a curved configuration to sheets in a direction transverse to the direction of travel of the sheets, and a drive belt positioned to convey sheets in the curved configuration to the stacking location.

The device for imparting a curved configuration to sheets may comprise a curved baffle arranged to cooperate with the drive belt at the input end of the feeding means. The drive belt can be substantially narrower than the baffle and may be located in the base of the curve. At the output end of the feeding means, there may be an output roll arranged to cooperate with the drive belt: the position of the roll relative to the length of the belt may be adjustable to vary the length of the sheet path through the feeding means. There may also be a further device, for example a further curved baffle, at the output end of the feeding means for maintaining the said curved configuration in sheets that are fed out, from the feeding means, to be deposited at the stacking location. When the stacking location comprises a tray having an end guide which is adjustable to vary the length of the tray, the output roll and the further baffle may be movable with the end guide.

In another aspect, the invention provides sheet stacking apparatus including a stacking location and means for feeding sheets to form a stack at the stacking location, wherein the stacking location has an end guide which is movable to adapt the stacking location to receive sheets of different lengths.

The feeding means includes: a drive belt a device arranged to impart a corrugated/curved configuration to sheets in a direction transverse to the direction of the sheets, and an output roll. The output roll cooperates with the belt at the output of the feeding means to deliver sheets to the stacking location, and moves with the end guide whereby the position of the roll relative to the belt is adjusted when the stacking location is adapted to receive sheets of a different length.

The present invention further provides sheets stacking apparatus of the type including a stacking tray and means for feeding sheets to the tray to form a stack of sheets therein, said feeding means being operable to feed sheet to a position above sheet already stacked in the tray and then release the sheet to the stack; wherein the feeding means comprises a drive belt a first curved baffle arranged to cooperate with the drive belt as the input end of the feeding means, and an output roll and a second curved baffle arranged to cooperate with the drive belt at the output end of the feeding means; whereby said first baffle imparts a curved configuration to sheets in a direction transverse to the direction of travel of the sheets, said drive belt conveys sheets in the curved configuration to the output end of the feeding means, and said second baffle maintains the curved configuration as sheets are fed out from the feeding means to a position above the stack; and wherein the tray has an end guide in which the output roll and the second baffle are mounted, the end guide being movable to vary the length of the tray and, therewith, the location of the output end of the feeding means.

By way of example, sheet stacking apparatus constructed in accordance with the invention will be described with reference to the accompanying drawings, in which.

The sheet stacking apparatus described below is associated with the duplex buffer tray of a copier although it could be used in other situations when sheets are to be stacked in a location to which they are fed one after another. A duplex buffer tray is provided in a copier when duplex copies are to be produced and its function will be described briefly with reference to FIG. 1.

Figure 1:
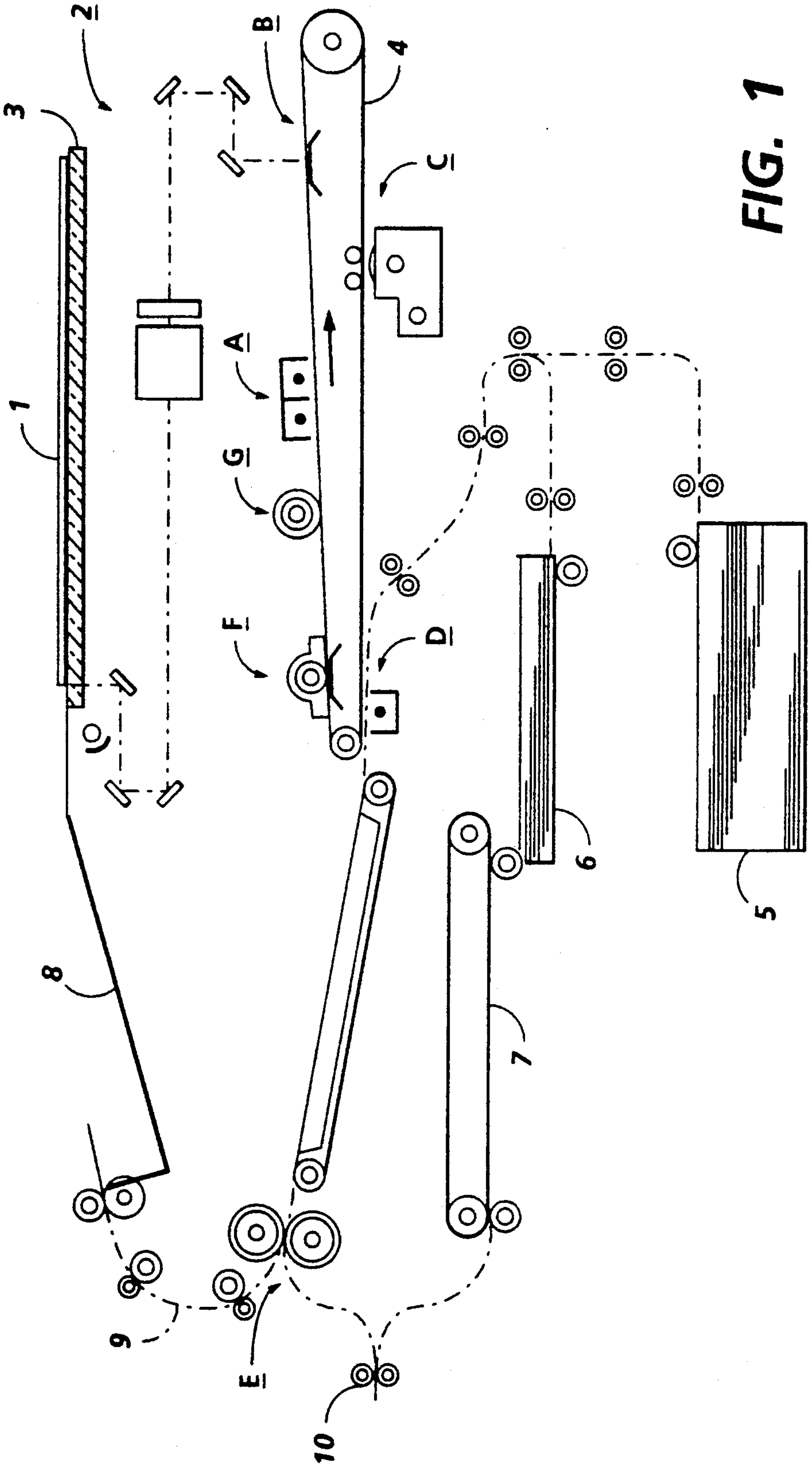
FIG. 1 is a diagrammatic side view of copier incorporating a duplex buffer tray.

In the copier shown in FIG. 1, original documents are fed, one after another (for example by a recirculating document handler, not shown) to the platen 3 of the copier. When a document 1 is on the platen 3, an electrostatic latent image of the document is formed at an exposure station B on the photoreceptor belt 4 of the copier. The image is formed by an imaging system indicated generally at 2 and, thereafter, the document is returned to a storage tray (not shown).

Also associated with the photoreceptor belt 4 are a charging station A at which the belt is charged to a relatively high uniform potential upstream of exposure station B; a development station C at which the latent image is developed with toner particles; a transfer station D at which the toner image is transferred to a copy sheet; and a cleaning station F at which residual toner particles are removed from the belt 4 which is then illuminated by a lamp G to remove any residual charge before the start of the next cycle. These operations are all well known and need not be described in detail.

A tray 5 is provided to hold a supply of clean copy sheets onto which images of the documents fed to platen 3 are to be printed. Sheets are fed from the tray 5 to the station D at the photoreceptor belt 4 and, following the transfer of a toner powder image from the photoreceptor, each sheet is then fed to a fusing station E where the transferred image is fused to the sheet. From the fusing station E, copy sheets will be deflected to a duplex buffer tray 6 via a belt feeder 7 or the copier output tray 8 via an output path 9.

Sheets deflected to the duplex tray 6 travel via an inverter (of which only the inverter nip 10 is shown) so that they are stacked image face up in the tray, in the order in which they were printed. They are then fed from the bottom of the stack back to the transfer station D at the photoreceptor belt 4, for the transfer of an image to the second side. The now-duplexed copy sheets are then fed into the output path 9 of the copier and finally to the output tray 8.

Figure 2:
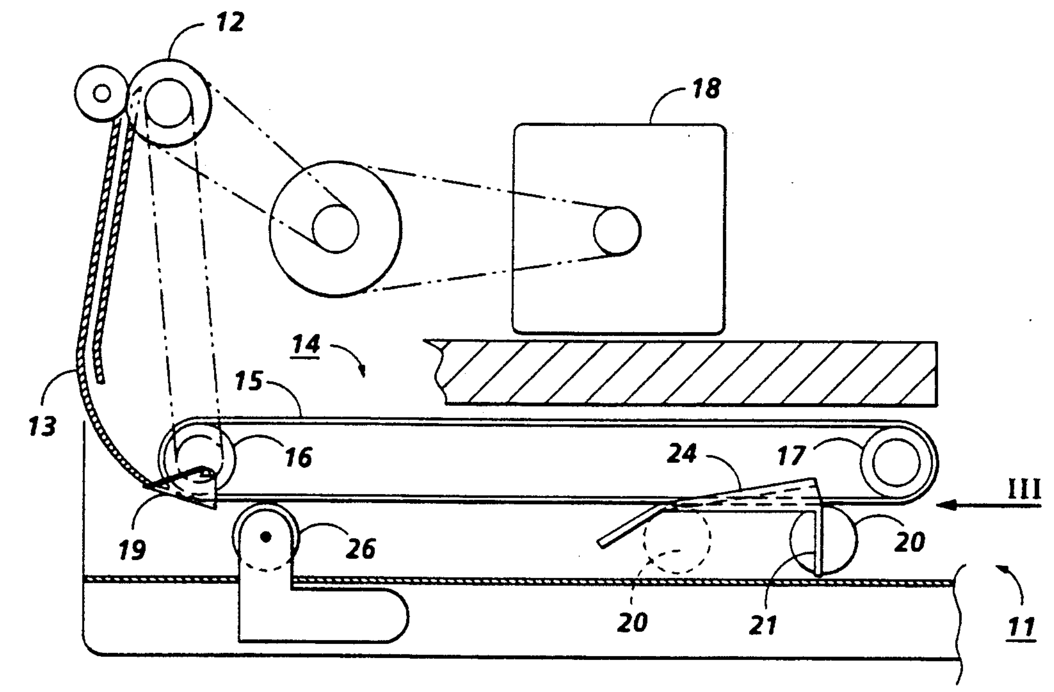
FIG. 2 is a schematic side view of sheet stacking apparatus associated with a duplex buffer tray.
Figure 3:
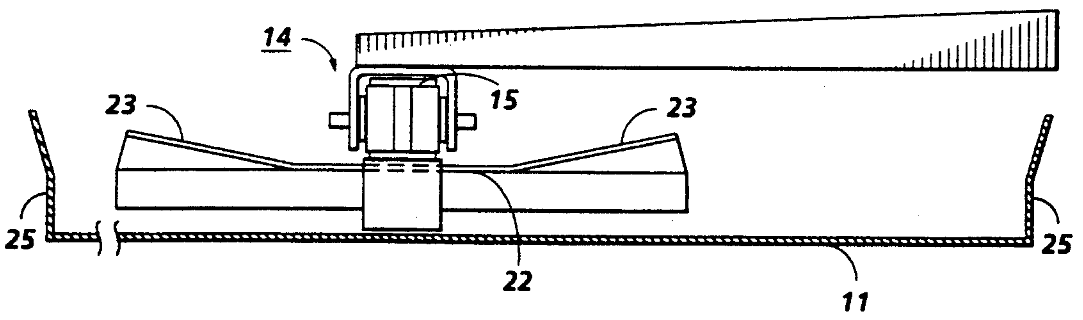
FIG. 3 is a view in the direction of the arrow III of FIG. 2.
Figure 4:
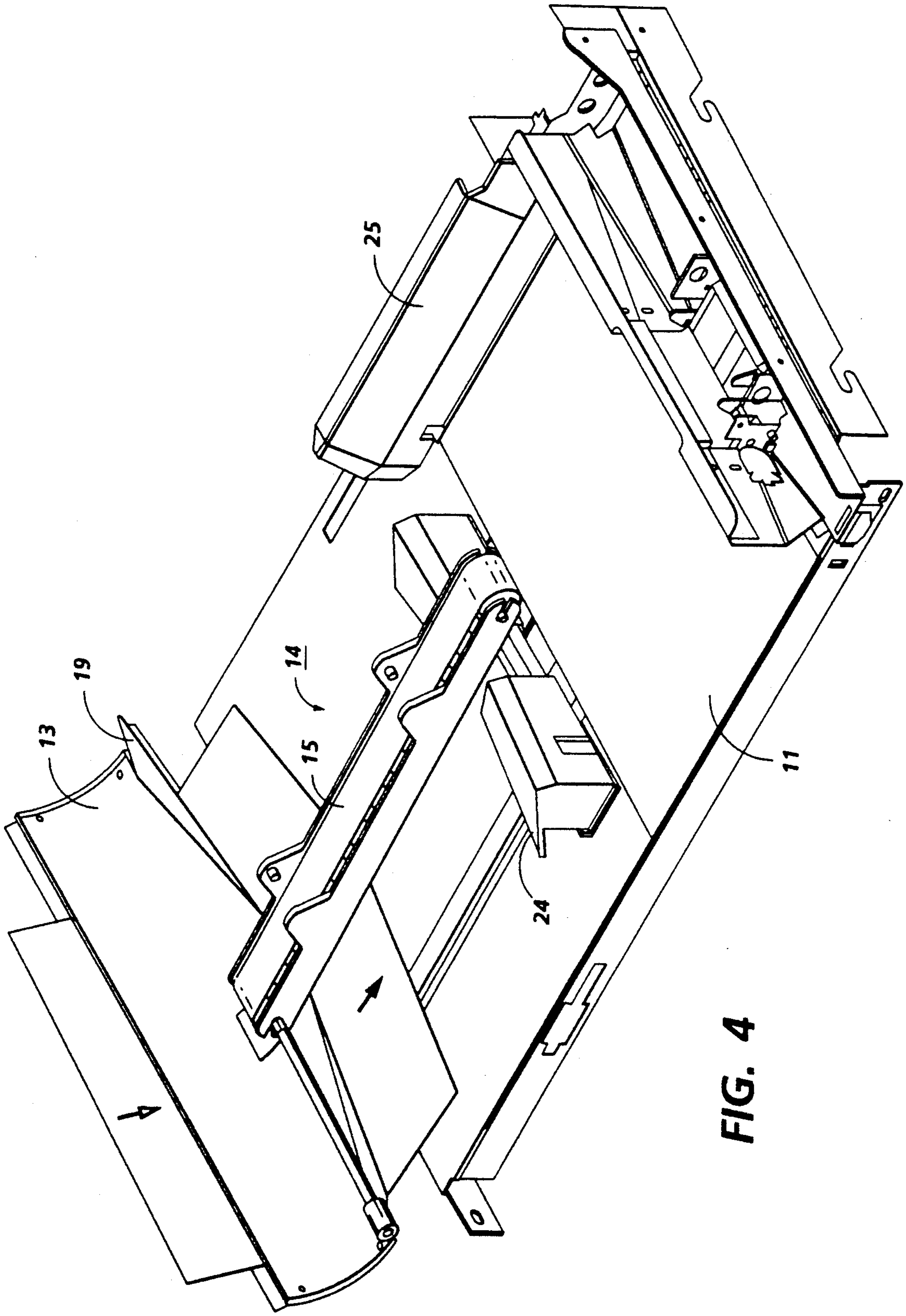
FIG. 4 is a perspective view of the apparatus.

Further description of the copier is not required for an understanding of the stacking apparatus shown in FIGS. 2 to 4. That apparatus is associated with the duplex buffer tray 11 of a copier, the function of which is similar to that of the tray 6 of the copier shown in FIG. 1.

In FIGS. 2 to 4, copy sheets from the conventional fusing station (such as that shown at E in FIG. 1) are fed to the duplex tray 11 via transport rollers 12 (shown in FIG. 2 only), a curved guide 13 and a belt feeder 14.

The belt feeder 14 comprises a narrow belt 15 which passes around a driven roll 16 at one end and an idler roll 17 at the other. The roll 16 is driven from a motor 18. At the upstream end of the feeder, the belt 15 cooperates with a corrugating baffle 19 and, towards the downstream end, with an output idler roll 20 which is carried by the rear edge guide 21 of the duplex tray 11. The rear edge guide 21 is movable to adjust the size of the tray 11 as will be described below.

The corrugating baffle 19, when viewed in a direction transverse to the direction of sheet movements, has a flat central portion 22 and on each side of the central portion an upwardly-inclined portion 23. An incoming sheet to the belt feeder 14 moves under the drive roll 16 and belt 15 and over the upper surface of the baffle 19 and is curved upwardly by the baffle. The curved configuration is maintained as the sheet moves through the feeder towards the tray 11 and is taken up by the roll 20 and a second, similarly-shaped baffle 24 mounted on the rear edge guide 21 of the tray. The curved configuration imparts beam strength to the sheet so that a reduced amount of guidance is necessary to ensure passage of the sheet through the feeder. It can be seen from FIG. 3 that, between the baffles 19 and 24, guidance is restricted to the central portion of the sheet and is provided by the narrow belt 15 so that access to the feeder area is comparatively unrestricted.

As the sheet moves out of the feeder and over the tray 11, the curved configuration (and the beam strength imparted thereby) is maintained until the trailing edge of the sheet has left the second baffle 24. This deters the leading edge of the sheet from dropping prematurely into the tray and giving rise to stacking problems: rather, when the sheet does leave the output roll 20 of the feeder, it will be well positioned over the tray and will fall accurately on to any sheets already in the tray.

The tray 11 has side guides 25 (only one of which is shown in FIG. 4) which, like the rear edge guide 21, are movable to adjust the size of the tray. The adjustment of the side and rear edge guides can be carried out manually or can be automated. When the rear edge guide 21 is moved, the output point of the belt feeder (defined by the output roll 20) is automatically adjusted as well. In other words, if the length of the tray 11 is increased (for example by moving the rear edge guide from the solid line to the dotted line position in FIG. 2) the length of the sheet path through the feeder is decreased and vice versa. To enable comparatively short sheets to be carried through the feeder, an additional pop-up roll 26 is provided to come into operation, between the baffle 19 and the output roll 20 as shown in FIG. 2 when the distance between the baffle and the output roll exceeds the length of the sheets. For longer sheets, the roll 26 is retracted. Adjustment of the output point of the belt feeder does not require any adjustment of the belt 15 and can be readily effected.

The pop-up roll 26 could be replaced by any other suitable means for enabling comparatively sheets to bridge the distance between the input baffle 19 of the feeder and the output roll. For example, some form of extendible baffle could be used, the length of the baffle being increased (to shorten the distance that has been briged b a sheet) as the length of the tray 11 is decreased.

Although the belt feeder 14 has been described as supplying sheets to a duplex buffer tray, this is not essential and a similar feeder could be used to form a stack of sheets, at any location. The tray 11 could, for example, be used during color printing to store sheets that are to be returned to the transfer station 6 at the photoreceptor (FIG. 1), for further printing in a different color on the side that already carries an image. In this case, the sheets would not be inverted before being stacked in the tray 11.

The belt feeder is also not restricted to use in a copier and could be used in other document-handling situations.

Moreover, although the simple curved (i.e. bow-shaped) configuration imposed by the input baffle 19 of the feeder is likely to be adequate for most weights and sizes of sheets to ensure satisfactory delivery to the tray 11, other forms of corrugating devices could be employed at the input to the feeder to impart other forms of curved configuration to the sheets if required.

I claim:

1. Sheet stacking apparatus including means for feeding sheets to form a stack at a stacking location, said means comprising a device arranged to impart a corrugated/curved configuration to sheets in a direction transverse to the direction of travel of the sheets; a drive belt positioned to convey sheets in the corrugated/curved configuration to the stacking location; an output roll arranged to cooperate with the drive belt at the output end of the feeding means, and wherein the position of the output roll relative to the length of the belt is adjustable to vary the length of the sheet path through the feeding means; a baffle associated with the output roll and movable therewith to maintain the said corrugated/curved configuration in sheets that are fed out, from the feeding means, to be deposited at the stacking location, and wherein the stacking location comprises a tray having an end guide which is adjustable to vary the length of the tray and wherein the output roll and the said baffle are movable with the end guide.

2. Sheet stacking apparatus including a stacking location and means for feeding sheets to form a stack at the stacking location, wherein the stacking location has an end guide which is movable to adapt the stacking location to receive sheets of different lengths and wherein the feeding means included: a drive belt, a corrugating device arranged to impart a corrugated/curved configuration to sheets being delivered to the stacking location, and an output roll which cooperates with the belt at the output of the feeding means to deliver sheets to the stacking location, the output roll and the corrugated device being movable with the end guide whereby the position of the roll and the said device to the belt is adjusted when the stacking location is adapted to receive sheets of a different length.

3. Apparatus, according to claim 2, including device for imparting a corrugated/curved configuration to sheets at the input of the feeding means, the drive belt being arranged to convey sheets in the said corrugated/curved configuration.

4. Sheet stacking apparatus of the type including a stacking tray and means for feeding sheets to the tray to form a stack of sheets therein; said feeding means being operable to feed a sheet to a position above sheets already stacked in the tray and then to release the sheet to the stack;

wherein the feeding means comprises a drive belt, a first curved baffle arranged to cooperate with the drive belt at the input end of the feeding means, and an output roll and a second curved baffle arranged to cooperate with the drive belt at the output end of the feeding means; whereby said first baffle imparts a curve configuration to sheets in a direction transverse to the direction of travel of the sheets, said drive belt conveys sheets in the curved configuration to the output end of the feeding means, and said second baffle maintains the curved configuration as sheets are fed out from the feeding means to a position above the stack; and wherein the tray has an end guide on which the output roll and the second baffle are mounted, the end guide being movable to vary the length of the tray and, therewith, the location of the output end of the feeding means.

5. Sheet stacking apparatus according to claim 4 wherein said stacking tray is a buffer tray including means for feeding sheets from the tray from the bottom of the said stack, and wherein said buffer tray is within a reprographic machine.

* * * * *